United States Patent [19]
Hause

[11] 3,745,643
[45] July 17, 1973

[54] METHOD OF MAKING A TORQUE TRANSMITTING UNIT

[75] Inventor: Gilbert K. Hause, Bloomfield Hills, Mich.

[73] Assignee: General Motors Corporation, Detroit, Mich.

[22] Filed: Mar. 11, 1971

[21] Appl. No.: 123,320

Related U.S. Application Data

[62] Division of Ser. No. 805,745, March 10, 1969, Pat. No. 3,590,966.

[52] U.S. Cl. ...................... 29/510, 29/516, 287/109
[51] Int. Cl. ...................... B21d 39/00, B23p 11/00
[58] Field of Search ...................... 29/516, 510, 517; 287/109; 192/3.21

[56] References Cited
UNITED STATES PATENTS

| | | | |
|---|---|---|---|
| 1,329,479 | 2/1920 | Savon | 287/109 X |
| 1,689,244 | 10/1928 | Klimek | 192/3.21 |
| 1,929,608 | 10/1933 | Rea | 29/517 UX |
| 1,946,756 | 2/1934 | Oberg | 29/417 UX |
| 2,813,664 | 11/1957 | Punte | 29/510 X |
| 2,995,009 | 8/1961 | Rush | 29/510 X |

Primary Examiner—Charlie T. Moon
Attorney—W. E. Finken, A. M. Heiter and Charles R. White

[57] ABSTRACT

The housing of a torque transmitting unit is connected to a flywheel formed at the end of an engine crankshaft by an improved method comprising: forming an annular groove and radial holes in the outer periphery of the flywheel and subsequently deforming a portion of the housing which overlaps the flywheel into the grooves and holes to provide a fluid tight and rigid connection capable of transmitting engine torque into the input rotor.

5 Claims, 1 Drawing Figure

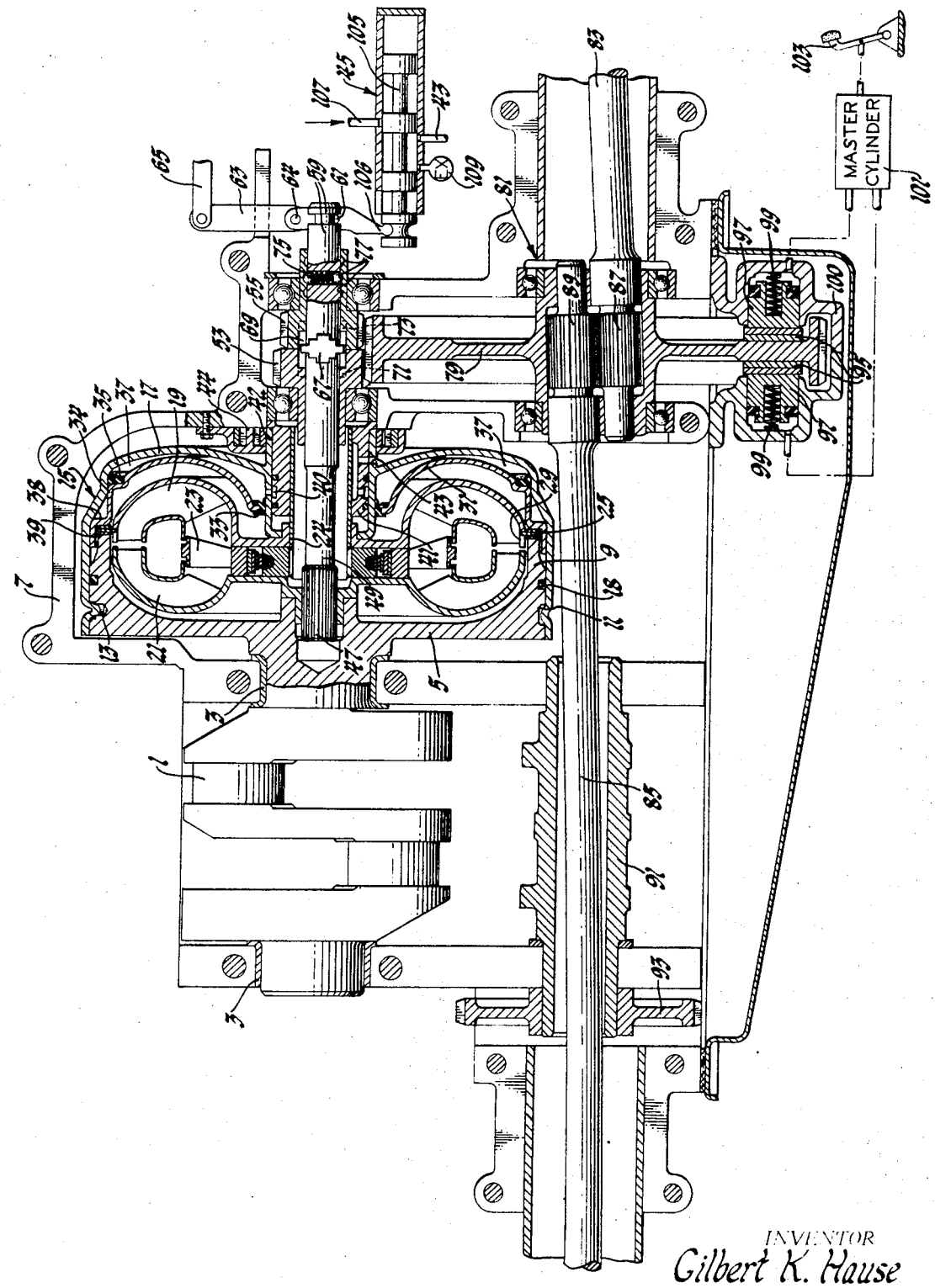

METHOD OF MAKING A TORQUE TRANSMITTING UNIT

This is a division of application Ser. No. 805,745, filed Mar. 10, 1969, now U.S. Pat. No. 3,590,966.

This invention relates to a method of making a torque transmitting unit and more particularly to an improved connection of a housing of a converter or coupling to a rotatable annular input such as a flywheel.

In low-power-to-weight vehicles, such as the small economy type passenger car, multi-stepped manual transmissions are generally employed to provide a range of output torques needed for efficient vehicle operation. Due to the cost, complexity and space requirements, automatic torque converter transmissions generally have not been employed in such vehicles.

This invention provides a highly efficient torque converter transmission, which is inexpensive, uncomplicated and sufficiently small to be effectively employed in the low-power-to-weight vehicles mentioned above. Although this invention is primarily for smaller vehicles as mentioned above, it can be employed in larger vehicles such as the standard six-passenger car.

The cost of this transmission is materially reduced by utilizing a new and improved method for connecting the flywheel and converter housing. Furthermore, simplified forward and reverse gearing is provided and there are new and improved controls for eliminating power flow through the converter when the transmission gearing is conditioned for neutral. In this invention, forward and reverse transmission gears mesh directly with the differential input gear, thereby providing a reduction in transmission size and weight. In this invention the converter pump is selectively connected to the flywheel by improved clutch and controls for forward and reverse drives.

An object of this invention is to provide a new and improved method of connecting an annular transmission input and a metallic torque housing of a torque transmitting unit in which a portion of the housing is deformed into an annular groove and spaced openings formed in the input to rigidly connect these parts in an assembly which is fluid tight and which can transmit torque.

Another object of this invention is to provide a new and improved method for connecting a hydrodynamic unit housing to a flywheel formed at one end of an engine crankshaft; the outer periphery of the flywheel is formed with an annular groove and inwardly extending holes so that a torque transmitting connection is made between these parts by deformation of a portion of the housing overlying the flywheel into the grooves and holes. An annular seal between the housing and flywheel disposed in a groove in the flywheel may be employed to improve the sealing between the housing and flywheel.

Another object of this invention is to provide a new and improved method of making a torque transmitting unit for vehicles in which the housing or shell of a converter or coupling is deformed into suitable openings formed in an outer portion of a rotatable input member to provide a sealed unit capable of transmitting the torque developed by a vehicle engine into the hydrodynamic unit.

These and other objects of the invention will become more apparent from the following detailed description and from the drawing in which:

The FIGURE is a side view partly in section of a torque converter transmission and controls thereof.

As shown in the FIGURE, engine crank shaft 1, journaled in bearings 3 is drivingly connected to a flywheel 5 located in case 7. The flywheel has an annular rim 9 with an outwardly facing circular groove 11 machined therein and a series of spaced holes 13. The holes are drilled radially inwardly from the bottom of the groove toward the rotational axis of the flywheel 5 and a connected torque converter 15. The torque converter has a metallic shell-like housing 17, which has an annular side that fits over the rim of the flywheel. The annular portion of the side of the housing which extends over the groove 11 and radial holes 13 is deformed into the grooves and holes to rigidly assemble the housing to the flywheel.

This connection may be accomplished by utilizing an electromagnetic forming process. The housing is slipped on the flywheel and held in place by a fixture and then placed inside an electromagnetic forming coil. Upon discharge of sufficient electrical energy through the coil, from a capacitor bank for example, the portion of the housing aligned with the groove and holes is swaged simultaneously into the groove and holes by magnetic forces emanating from the coil to rigidly connect the parts. The annular seal 18 disposed between the flywheel and the housing 17 makes this assembly fluid-tight. If desired, the assembly can be made employing a mechanical rolling operation with the holes staked for torsional rigidity.

The torque converter has a pump 19, a turbine 21 and a stator 23 bladed in a conventional manner for the circulation of oil supplied to the converter by a supply passage, not shown. A one-way brake connects the stator to a ground sleeve 24.

A clutch unit, which is preferably operated by engine oil, is employed to selectively connect or disconnect the flywheel and the pump; this unit comprises an annular, longitudinally movable friction plate 25 which has spaced tabs or teeth on the inner diameter which fit into corresponding spaced and longitudinally extending slots 29 formed in the outer shell of the pump thereby providing a spline-like connection. There is also an annular piston 31 disposed in the converter housing having an inner annular shoulder with a seal 33 molded thereon. This seal slidably mounts the piston on the inner cylindrical shoulder of the housing 17 as shown. The piston also has an outer annular shoulder 34 and annular seal 35 which slidably contact an annular internal portion of the housing to provide a chamber 37 between the end of housing 17 and piston 31. This chamber receives a pressure oil which effects displacement of the piston so that the radially extending annular apply surface 38 of the piston will contact the friction plate 25 and move it into frictional engagement with the transverse end portion of the flywheel to drivingly connect the flywheel and pump. When chamber 37 is open to exhaust, converter pressure provides the releasing force for piston 31 and the clutch 25. As shown in the Figure the outer end of the piston has extending tangs or fingers 39, which slidably engage with splines on the outer periphery of the flywheel. The piston only moves about 0.015 inch between full apply and full release and is always guided. The piston and housing have a similar radius of curvature to provide a compact arrangement of parts. The housing 17 further has a cylindrical sleeve 42 that extends away from the torque converter and is operatively connected to the drive gear of fluid pump 44. Because the metal in the converter housing 17 extends into the axial holes in the flywheel, there is sufficient torsional rigidity to permit the engine and flywheel to drive the pump through the housing.

Chamber 37 is hydraulically connected by a passage in the housing to an annular groove 40 formed in a support sleeve 41, that supports rotatable housing 17 and rigidly connects the ground sleeve to case 7. Annular groove 40 is connected by a suitable passage 43 to a control valve 45, which will be later described. The turbine 21 has a hub journaled in the flywheel and is drivingly connected by splines 47 to a power transmitting shaft 49. This shaft is coaxial with the flywheel and torque converter and extends from the torque converter through forward and reverse drive gears 53 and 55 respectively located adjacent to one another and rotatably mounted on the shaft. The shaft terminates in an end extension having spaced flanges 59 arranged to slidably receive a pin 61 therebetween secured to a crank member 63 which is supported in case 7 for turning with respect to axis 64. This crank member is turned by link 65 operatively secured to a conventional shift lever, not shown. The shaft 49 carries a stepped tooth dog clutch element 67 that is fixed to the shaft and is accommodated by recess 69 formed between the gears 53 and 55. These gears are formed with internal clutching teeth 71 and 73 respectively which are drivingly engageable with the stepped tooth dog clutch element to connect the shaft 49 to either gear 53 or gear 55. In the position shown in the drawing, the dog clutch element is in the neutral position and no power can flow from the shaft to either gear.

The shaft 49 can be selectively connected to either gear 53 or 55 by appropriate axial movement of the shaft from the illustrated position in response to actuation of the shift lever and the corresponding longitudinal movement of connected link 65 and rotation of crank 63. As shown, the shaft carries a spring biased ball detent 75, whose ball members fit into any one of the three side-by-side spaced grooves 77 to releasably hold the shaft in an adjusted position. When the shaft 49 is moved in either direction from its neutral position, illustrated in the drawing, the teeth of the dog clutch element engage the appropriate clutching teeth of the selected gear 53 or 55 to thereby drivingly connect the shaft 49 with the selected gear.

Gear 53, providing a forward drive gear, meshes with gear 79 of a differential drive 81, which is the subject of Pat. No. 3,520,213, issued July 14, 1970 to Gilbert K. Hause and Clifford C. Wrigley and this differential is only briefly described here.

The gear 55 meshes with an idler not shown, which in turn meshes with differential input gear 79 to provide a reverse drive. As shown, gear 79 has transverse openings into which the inner ends of a pair of axle shafts 83 and 85 are rotatably journaled. These shafts extend longitudinally as does shaft 49 and have meshing spur gears 87 and 89 to provide for differential speeds of the drive wheels when the vehicle using this transmission negotiates a turn. To provide a compact power package, axle shaft 85 is disposed through engine cam shaft 91 which is driven by timing gear 93.

In this embodiment disc brakes are employed on opposite sides of the gear 79 to provide vehicle service brakes. As shown, each brake assembly comprises a brake shoe 95, hydraulically actuated piston 97 and spring 99. Each shoe comprises a friction liner secured to a plate movably mounted in fixed caliper 100. The spring 99 is disposed at the rear of each piston, mounted in a bore in the caliper, provides a low force to lightly engage the shoe with the friction surface of gear 79 to thereby provide a mechanism for automatically adjusting the brakes as they wear. The parasitical drag of the lining on the friction surface of the gear is sufficiently low so that it can be disregarded. The brakes are operated in a lubricant for improved cooling. As diagrammatically illustrated, the pistons are hydraulically connected to a master cylinder 101 so that the brakes are applied when the brake pedal 103 is depressed and so that they are released when the brake pedal is released.

The control valve 45 has a valve element 105 shiftable to direct fluid to and away from the piston chamber 37. As shown, the valve element has a flanged operator end portion which slidably receives the extension 106 of crank 63. In the neutral position shown, the valve element blocks the supply of fluid from the pump 44 fed to the valve through passage 107. With no pressure in chamber 37 the clutch plate will be disengaged by converter supply pressure. In neutral, both the converter and gear clutches are disengaged to provide a no-torque neutral.

In operation, forward drive is selected by moving link 65 to the right thereby turning crank 63 on pivot 64 clockwise. Crank pin 61 will ride upwardly between flanges 59 and also push shaft 49 in toward the crank shaft with splines 47 permitting this movement.

The dog clutch element 67 engages clutching teeth 71 to lock the forward gear 53 to the shaft 49. At the same time, the valve element is shifted to a forward drive position with the center land blocking exhaust 109 and the passage 43 open to the passage 107. Fluid pressure is admitted to chamber 37 and the clutch is applied to connect the pump to the flywheel. Under these conditions the torque converter is operative to transmit and multiply torque to shaft 49. Power flows through shaft 49 through the forward drive gear 53 to differential gear 79 which runs partially submerged in oil. Power then flows to the axle shafts 83 and 85. Reverse is selected by pushing link 65 toward the converter to turn the crank counterclockwise with respect to pivot 64. The crank slides shaft 49 to the right so that dog clutch element 67 will drivingly engage the reverse gear 55 and also move the valve element through a neutral, exhaust position to a third position in which chamber 37 is again charged with fluid under pressure. This momentary interruption of converter operation when shifting between forward and reverse causes shaft 49 and the gear 79 to decelerate and prevents a sudden torque reversal on the differential input gear.

Springs 99 apply forces only sufficient to maintain the shoes in light contact with the lubricated annular friction surfaces of the large transfer or differential gear 79 and without removing the oil film thereon. This provides for improved braking since the shoes will effect high capacity braking action as soon as pedal 103 is depressed. The lubricant in the housing is at least sufficient to cover the friction surfaces of the brake shoes.

While a preferred method has been disclosed, various changes and modifications will now be apparent to those skilled in the art and may be made without de-

What is claimed is:

1. The method of making a hydrodynamic torque transmitting unit comprising the steps of providing a rotatable input member with a curved peripheral surface, forming a curved recess in said input member extending inwardly from said peripheral surface, providing spaced openings in said input member extending inwardly from said peripheral surface, operatively mounting input and output rotor means adjacent to said input member, fitting a curved housing of sheet metal over said input and output rotor means and over said peripheral surface so that said housing overlaps said recess and said spaced openings, maintaining said housing and said input member in said overlapping relationship, and deforming a portion of said housing which overlaps said recess and said openings into said recess and said openings to thereby rigidly fasten said housing to said input member so that said housing is capable of transmitting torque from said input member to said input rotor means.

2. The method of making a hydrodynamic torque transmitting unit comprising the steps of providing a rotatable input member with an annular peripheral surface, forming a recess in said input member that extends completely around said input member and that extends inwardly of said peripheral surface, providing spaced openings in said input member extending inwardly from said peripheral surface, operatively mounting input and output rotor means for rotation adjacent to said input member, securing an output to said output rotor means, fitting an annular housing of sheet metal over input and output rotor means and over said peripheral surface so that said housing closely fits over and overlaps said recess and said spaced openings, providing a drive connection between said housing and said input rotor means, maintaining said housing and said input member in said overlapping relationship, and deforming portions of said housing into said recess and said openings to thereby securely fasten said housing to said input so that torque can be transmitted from said input member through said housing to said input rotor means.

3. The method of joining an annular shell for housing a hydrodynamic unit to a rotatable annular flywheel member comprising the steps of forming an annular recess in the outer peripheral surface of said flywheel member which extends inwardly toward the rotational axis thereof, forming a series of radial holes in said flywheel member which extend inwardly toward the rotational axis of said flywheel member, fitting a portion of said shell of the hydrodynamic unit over the outer peripheral surface of said flywheel member having said annular recess and said radial holes, maintaining said housing and said flywheel member in the overlapping relationship and deforming the part of said housing which overlaps said annular recess and radial holes into said annular recess and radial holes to thereby rigidly fasten said housing to said flywheel member.

4. The method of joining and hydraulically sealing a metallic housing of a hydrodynamic torque transmitting unit to the outer annular surface of a rotatable flywheel adapted to be driven by an engine comprising the steps of installing input and output rotor means adjacent to said flywheel, forming an annular groove in the outer peripheral surface of said flywheel which extends inwardly toward the rotational axis of said flywheel, installing an annular and yieldable fluid sealing member in said groove, providing a plurality of spaced and inwardly extending recess means in said flywheel in the outer annular surface thereof between said annular groove and the outer edge portion of said flywheel, installing an annular housing over said flywheel and said rotor means and in an overlapping relationship with said sealing member and said inwardly extending recess means so that said yieldable sealing member contacts the inner wall of said housing to provide a fluid tight seal between said housing and said flywheel, and deforming a portion of said housing into said inwardly extending recess means to secure said housing to said flywheel for torque transmittal between said flywheel and said housing.

5. The method of joining and sealing a metallic housing of a hydrodynamic unit which drives hydraulic pump means to the outer annular surface of a rotatable flywheel adapted to be driven by an engine comprising the steps of forming an annular groove in the outer peripheral surface of said flywheel, inserting an annular elastomeric fluid sealing member in said groove, providing an inwardly extending annular groove in said flywheel in the outer surface thereof between said first-mentioned annular groove and an outer edge portion of said flywheel, forming a series of radially extending holes that extend from the bottom surface of said second mentioned annular groove, installing the annular housing over said flywheel in an overlapping relationship with said sealing member and said inwardly extending groove and radial holes so that said elastomeric member contacts the inner wall of said housing to provide a fluid tight seal between said housing and said flywheel, and deforming a portion of said housing into said second mentioned annular groove and into said radially extending holes to thereby secure said housing to said flywheel so that drive torque can be transmitted from said flywheel to said pump.

* * * * *